United States Patent [19]

Miyakawa et al.

[11] Patent Number: 5,672,409

[45] Date of Patent: Sep. 30, 1997

[54] POLYESTER FILM REFLECTOR FOR A SURFACE LIGHT SOURCE

[75] Inventors: Katsutoshi Miyakawa; Kenji Tsunashima, both of Kyoto; Seizo Aoki, Koka-gun, all of Japan

[73] Assignee: Toray Industries, Inc., Tokyo, Japan

[21] Appl. No.: 151,764

[22] Filed: Nov. 15, 1993

Related U.S. Application Data

[63] Continuation of Ser. No. 824,163, Jan. 22, 1992, abandoned.

[30] Foreign Application Priority Data

| Jan. 22, 1991 | [JP] | Japan | 3-020328 |
| Mar. 27, 1991 | [JP] | Japan | 3-063517 |

[51] Int. Cl.⁶ .......................................... B32B 5/16
[52] U.S. Cl. .......................... 428/141; 428/480; 428/913;
428/143; 428/910; 428/409; 428/483; 428/315.5;
428/315.9; 428/316.6; 428/317.9; 428/318.6;
428/319.7; 428/304.4; 428/323; 428/330;
428/327; 428/338; 428/339; 521/138
[58] Field of Search .................................. 428/480, 913,
428/141, 143, 910, 409, 483, 315.5, 315.9,
316.6, 317.9, 318.6, 319.7, 304.4, 323,
330, 327, 338, 339; 521/138

[56] References Cited

U.S. PATENT DOCUMENTS

| 3,870,593 | 3/1975 | Elton et al. | 428/220 |
| 3,944,699 | 3/1976 | Mathews et al. | 428/220 |
| 3,957,651 | 5/1976 | Kesting | 521/61 |
| 4,075,050 | 2/1978 | Takashi et al. | 428/317.9 |
| 4,113,908 | 9/1978 | Shinomura | 428/317.9 |
| 4,120,724 | 10/1978 | Tatsuta et al. | 430/533 |
| 4,350,655 | 9/1982 | Hoge | 523/200 |
| 4,539,256 | 9/1985 | Shipman | 428/318.4 |
| 4,663,216 | 5/1987 | Toyoda et al. | 428/212 |
| 5,002,823 | 3/1991 | Mimura et al. | 428/315.7 |
| 5,061,565 | 10/1991 | Aoki et al. | 428/409 |

FOREIGN PATENT DOCUMENTS

| 62-169105 | 7/1987 | Japan . |
| 63-62104 | 3/1988 | Japan . |
| 2269382 | 2/1990 | Japan . |

Primary Examiner—William Watkins
Attorney, Agent, or Firm—Birch, Stewart, Kolasch & Birch, LLP

[57] ABSTRACT

A reflector used in a surface light source comprising a white polyester film in which fine voids are formed and whose apparent specific gravity is in the range of 0.5 to 1.2. The reflectance of the polyester film can be increased by the fine voids. When the reflector having a high reflectance is used in a surface light source having a side light system, a bright scope of, for example, a liquid crystal display easy to see can be obtained.

2 Claims, 2 Drawing Sheets

POLYESTER FILM REFLECTOR FOR A SURFACE LIGHT SOURCE

This application is a continuation of application Ser. No. 07/824,163 filed on Jan. 22, 1992, now abandoned.

BACKGROUND OF THE INVENTION

1. Field of the Invention

The present invention relates to a reflector used in a surface light source, and more particularly to a substrate used for a reflector of a surface light source, which can produce a bright scope when a side light system (also called an edge light system) is employed for the surface light source as a method for illuminating a liquid crystal display or an electric decorative board etc.

2. Description of the Prior Art

A back light system, wherein a display is lighted from a back surface, has been employed as a method for illuminating a liquid crystal display or an electric decorative board. Recently, however, a side light system, such as system disclosed in JP-A-SHO 63-62104, has been broadly applied therefor. The advantages of a side light system is that it can be made thin and can illuminate the display or board uniformly. In the side light system, halftone dots are printed on one surface of a transparent substrate having a certain thickness such as an acrylic plate, and a light from a light source such as a cold cathode ray tube is applied to the substrate through the edge of the substrate. The applied light is uniformly dispersed by the halftone dot print, and a scope having a uniform brightness can be obtained. Further, since the light source is disposed in the edge side, rather than in the back surface, the side light system can be made thinner than a back light system.

FIG. 3 illustrates a typical side light system. A reflector 11 (reflecting plate) is provided on one surface of a transparent light guiding plate 14 comprising a transparent substrate, on which halftone dots 15 are printed. A diffusion plate 13 and a liquid crystal display 12 are disposed on the other surface side. A light emitted from a cold cathode ray tube 16 is introduced through the edge of transparent light guiding plate 14 into the interior thereof. The light is uniformly dispersed by halftone dots 15, and the light reflected by reflector 11 illuminates the liquid crystal display 12 brightly.

In such a light system, a reflector must be provided on the back surface of transparent light guiding plate in order to prevent light from escaping through the back surface. This reflector must be thin and must have a high reflectance property. Although a metal deposited layer such as one disclosed in JP-A-SHO 62-169105 or a white synthetic paper such as one disclosed in JP-A-SHO 63-62104 has been used as the reflector, the deposited layer is expensive and the synthetic paper cannot produce a sufficiently bright scope. Accordingly, in practice, a white polyester film in which a white pigment such as titanium oxide is added, such as one disclosed in JP-A-HEI 2-269382, is used as the reflector.

However, although the reflectance of the reflector can be increased to some extent by using such a white polyester film whitened by adding a pigment such as titanium oxide, the increase of the reflectance is limited to an insufficient level. Moreover, since the pigment such as titanium oxide absorbs a light having a specific wave length, the reflectance in a certain range of wave length decreases. Consequently, a sufficiently bright scope cannot be obtained by using such a white polyester film whitened by a pigment as a reflector. Therefore, a brighter scope is required, and a reflector having a high reflectance over a broad range of wave length is strongly required.

SUMMARY OF THE INVENTION

Accordingly, an object of the present invention is to provide a reflector for a surface light source which has a high reflectance over a broad range of wave length and can illuminate a liquid crystal display or an electric decorative board brightly when the surface light source is employed for the display or the board.

To accomplish this object and other objects, a reflector used in a surface light source according to the present invention comprises a white polyester film in which fine voids are formed and having an apparent specific gravity in the range of 0.5 to 1.2. Namely, the white polyester film is used as a substrate of a reflector for a surface light source.

In the reflector according to the present invention, fine voids are formed in the polyester film so that the polyester film has an apparent specific gravity in the range of 0.5 to 1.2. The fine voids uniformly diffuse a light without absorbing a light having a specific wave length or sufficiently whitening the film. Therefore, the reflector can have a sufficiently high reflectance over a broad range of wave length. When the reflector having a high reflectance is used in a surface light source having a side light system, a bright scope easy to see can be obtained.

BRIEF DESCRIPTION OF THE DRAWINGS

Some preferred exemplary embodiments of the invention will now be described with reference to the accompanying drawings which are given by way of example only, and thus are not intended to limit the present invention.

DETAILED DESCRIPTION OF THE PREFERRED EMBODIMENTS OF THE INVENTION

Figure 1:
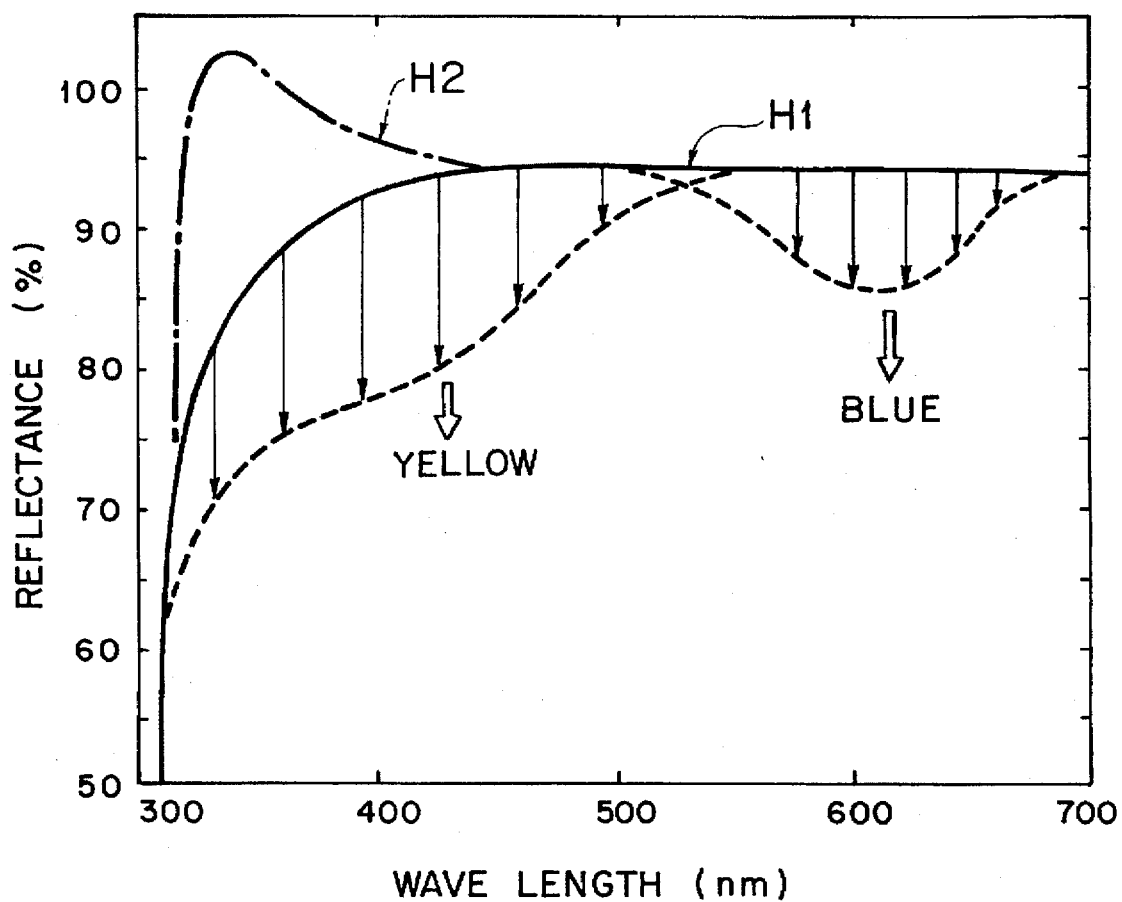
FIG. 1 is a graph showing the relationship between the wave length and the reflectance of a white polyester film used as a substrate for a reflector of a surface light source, according to an embodiment of the present invention.

Next, the present invention will be explained in more detail by embodiments and examples. However, the present invention is not restricted by the embodiments and examples.

The white polyester film used as a substrate for the reflector according to the present invention must contain fine voids. The fine void is a void having a size of not greater than 100 μm. The shape of the void is not particularly restricted, and the shape may be a sphere, a flat shape or so forth. If an additive such as a pigment or a color is used to whiten the film and increase the reflectance of the film, the additive absorbs light having a specific wave length and the reflectance in a certain range of wave length decreases. In the present invention, such an absorption of light can be suppressed to an extremely low level by whitening the polyester film and increasing the reflectance of the polyester film by the use of fine voids.

The apparent specific gravity of the white polyester film according to the present invention must be in the range of 0.5 to 1.2. Since the white polyester film contains fine voids, the apparent specific gravity of the white polyester film decreases as compared with that of an ordinary polyester film. If the apparent specific gravity of the white polyester film is lower than 0.5, the amount of the fine voids is too great, and the film becomes too weak in strength to be used as a substrate for the reflector. Further, film breakage is liable to occur in the film formation process. If the apparent specific gravity of the white polyester film is higher than 1.2, the amount of the fine voids is too low, and a sufficiently high reflectance cannot be obtained and the film cannot be sufficiently whitened.

Therefore, a sufficiently bright scope cannot be obtained when the film is used as a substrate for a reflector of a surface light source for a liquid crystal display etc.

The reflector according to the present invention comprises the white polyester film. Namely, the white polyester film is used as a substrate for the reflector. The thickness of a surface light source can be made sufficiently thin by using the white polyester film. Moreover, the white polyester film can be produced at a relatively low cost. Furthermore, since the polyester film has a high heat resistance, a high safety can be ensured even if the film is exposed to a light source having a relatively high temperature.

In the present invention, "polyester" means a polymer obtained by the condensation polymerization of a diol and a dicarboxylic acid. As the dicarboxylic acid, terephthalic acid, isophthalic acid, phthalic acid, naphthalenedicarboxylic acid, adipic acid, or sebacic acid can be used. As the diol, ethylene glycol, trimethylene glycol, tetramethylene glycol, or cyclohexanedimethanol can be used. More concretely, for example, polytetramethylene terephthalate, polyethylene-p-oxybenzoate, poly-1,4-cyclohexanedimethylene terephthalate, or polyethylene-2,6-naphthalenedicarboxylate can be used. Of course, these polyesters may be either homopolymer or copolymer. As a component to be copolymerized, a diol component such as diethylene glycol, neopentyl glycol or polyalkylene glycol and a dicarboxylic acid such as adipic acid, sebacic acid, phthalic acid, isophthalic acid or 2,6-naphthalenedicarboxylic acid can be used. In the present invention, polyethylene terephthalate is preferable from the viewpoint of water resistance, chemical resistance and durability. To the polyester, various kinds of known additives, for example, an oxidation inhibitor, an antistatic agent, etc. may be added by a volume which does not decrease the advantages according to the present invention.

If a white pigment has been added in order to whiten the above polyester film in the conventional method, increase of the reflectance of the film is limited to a relatively low level because the particles of the pigment absorb light having a specific wave length, and therefore, a sufficiently bright scope could not be obtained when such a film was used as a reflector. In the present invention, however, the polyester film is whitened by forming fine voids in the interior of the film and diffusing a light by the voids. By this, a high reflectance, which has not been obtained in the conventional films, can be achieved.

The fine voids are formed by finely dispersing a polymer incompatible with a film forming matrix material such as a polyester, and stretching the film uniaxially or biaxially. When the film is stretched, a void is formed around each particle of the incompatible polymer. Since the formed fine voids operate to diffuse a light, the film is whitened and a high reflectance can be obtained. The incompatible polymer is a polymer that does not dissolve into a polyester. As such an incompatible polymer, poly-3-methylbutene-1, poly-4-methylpentene-1, polypropylene, polyvinyl-t-butane, 1,4-transpoly-2,3-dimethylbutadiene, polyvinylcyclohexane, polystyrene, polyfluorostyrene, cellulose acetate, cellulose propionate or polychlorotrifluoroethylene can be used. Among these polymers, polyolefin, particularly polymethylpentene is preferable, because fine voids can be easily formed when the film is stretched, and futher, since the polymer has a high transparency, absorption of a light by the film itself is very little and the light diffused by the voids is not substantially absorbed by the film. Therefore, when such a film is employed as a reflector of a surface light source, a scope having a high brightness can be obtained.

The content of the incompatible polymer is preferably in the range of 2 to 25 wt %. If the content is lower than the above range, a sufficient whitening cannot be achieved and a high reflectance cannot be obtained. If the content is higher than the above range, the strength of the film becomes too small.

The index of whiteness of the film thus obtained is preferably not less than 70%, and more preferably not less than 80%. Although a high brightness of a scope is required when the film is used as a reflector for a surface light source, it is also desirable to increase the whiteness of the scope. Therefore, the index of whiteness of the film is preferably as high as possible.

In the present invention, preferably a density lowering agent is added to the film in order to uniformly disperse the incompatible polymer and sufficiently form the fine voids.

Uniform fine voids can be formed by the uniform dispersion of the incompatible polymer, and the degree of the whiteness and reflectance can be uniform. The density lowering agent is a specified compound which is added together with the incompatible polymer, disperses the incompatible polymer very finely, accelerates the generation of voids formed at the boundary between the polyester and the incompatible polymer, and is effective to lower the specific gravity of the film. As a density lowering agent for polyester, for example, polyalkylene glycol such as polyethylene glycol, methoxypolyethylene glycol, polytetramethylene glycol or polypropylene glycol, or derivative thereof, or copolymer thereof such as polyethylene terephthalate-polyethylene glycol or polybutylene terephthalate-polytetramethylene glycol, ethylene oxide/propylene oxide copolymer, sodium dodecylbenzenesulfonic acid, sodium alkylsulfonic acid, or glyceric monostearate can be used. In the present invention, polyalkylene glycol, particularly polyethylene glycol, polytetramethylene glycol or a copolymer of such a polyalkylene glycol and a polyester is preferable. The content thereof is preferably in the range of 0.1 to 5 wt %. If the content is too small, the effect due to the addition of the density lowering agent becomes too small. If the content is too large, the property of the film itself is damaged. Although the density lowering agent may be directly added at a required content or it may be added to a matrix polymer of the film to make a master polymer, and wherein the master polymer is blended at an appropriate content so that the content of the density lowering agent in the film is controlled to a desirable value, preferably the density lowering agent is added in a form of a copolymer with polyester. Since the above-mentioned advantages due to the density lowering agent become remarkable by adding it in a form of a copolymer with polyester. In this case, the polyester copolymerized with the density lowering agent may be different from the polyester used as a matrix of the film. Furthermore, the density lowering agent may be mixed with polyester after the density lowering agent has been added to and blended with the incompatible polymer. In such a case, since the density lowering agent is added in advance to the incompatible polymer whose composition ratio in the film is relatively small, the density lowering agent easily and efficiently acts as the boundary between the polyester and the incompatible polymer, and a high effect can be obtained even if the amount of addition of the density lowering agent is small.

In the present invention, the mean reflectance of the surface of the white polyester film in the range of wave length of a light of 400 to 700 nm is preferably not less than 90%, and further, the difference between the maximum and the minimum of the reflectance in the range of wave length is preferably not greater than 10%. This property is represented by, for example, a characteristic curve Hi shown by a continuous line in FIG. 1.

Namely, the mean reflectance is not less than 90%.in the main wave length area of 400 to 700 nm, and the difference between the maximum and the minimum of the reflectance in the main area is not greater than 10%. If the mean reflectance is lower than the above value, the scope tends to be yellow in the relatively low wave length area of the range and tends to be blue in the relatively high wave length area of the range when the white polyester film is used as a substrate for the reflector of a surface light source. However, the tendency to be yellow or blue can be prevented by the high mean reflectance of not less than 90%. Further, a uniform and bright scope can be obtained by suppressing the difference between the maximum and the minimum of the reflectance to a small value within 10%.

Moreover, the mean reflectance of the surface of the white polyester film in the range of wave length of a light of 330 to 380 nm is also preferably not less than 90%. This property is represented by, for example, a characteristic curve H2 shown by a dashed line in FIG. 1. It is possible to obtain a brighter scope by maintaining the mean reflectance in the wave length range of 330 to 380 nm at not less than 90%.

In the present invention, a glossiness $G_1$ under a condition of an angle of incidence of 60° and an angle of reflection of 60° is preferably not greater than 50%, more preferably not greater than 40%, and further more preferably not greater than 30%. A light introduced through an edge of a transparent light guiding plate is diffused by a halftone dot print and emitted toward a display or board. Light leaked from the halftone dot print is reflected by a reflector. If the glossiness $G_1$ is greater than 50%, most of the reflection is a mirror reflection and the light turned by the surface of the reflector is reflected again by the surface of the transparent light guiding plate. Therefore, the light cannot be emitted toward the display or board. If such a reflection between the surface of the reflector and the transparent light guiding plate is repeated, the light escapes from the edge of the light guiding plate or is absorbed by the light guiding plate. As a result, a bright scope cannot be obtained. In contrast, when the glossiness G, is not greater than 50%, most of the reflection at the surface of the reflector is a diffusing reflection, and most of the light can be emitted toward the display or board efficiently and without being absorbed. As a result, a scope having a high brightness can be obtained.

Further, when a glossiness under a condition of an angle of incidence of 60° and an angle of reflection of 45° is represented by $G_2$ and a glossiness under a condition of an angle of incidence of 60° and an angle of reflection of 75° is represented by $G_3$, the white polyester film preferably satisfies the following equations.

$G_2/G_1 \geq 0.05$ $G_3/G_1 \geq 0.05$

More preferably the following equations are satisfied.

$G_2/G_1 \geq 0.1$ $G_3/G_1 \geq 0.1$

Further more preferably the following equations are satisfied.

$G_2/G_1 \geq 0.2$ $G_3/G_1 \geq 0.2$

As described above, as the diffusing reflection becomes greater, the scope becomes brighter. Namely, as the glossinesses $G_2$ and $G_3$, which represents 5 the intensity of the diffusing reflection, become large relative to the glossiness $G_1$, which represents the intensity of the mirror reflection, the scope becomes brighter. If $G_2/G_1$ is less than 0.05 or $G_3/G_1$ is less than 0.05, the diffusing reflection is insufficient and a sufficiently bright scope cannot be obtained even if $G_1$ is not greater than 50%.

In the present invention, the surface roughness of the white polyester film is preferably not less than 0.1 µm by center line average height Ra, and more preferably not less than 0.15 µm. The surface is preferably rough in order to design the surface having glossinesses such as those described above. If the surface roughness Ra is less than 0.1 µm, it is difficult to obtain the above glossinesses.

Further, the ratio of the maximum height Rt and the center line average height Ra of the surface roughness Rt/Ra is preferably not less than 5, and more preferably not less than 10. The diffusing reflection can be achieved more easily and a brighter scope can be obtained when the surface roughness is average at a low level and rough portions exist in the surface than when the surface, roughness is average at a high level.

In the present invention, the white polyester film may have a lamination structure of a plurality of layers. For example, lamination structures of a two lay we structure of A/B and a three layer structure of A/B/A can be employed. In such cases, preferably the B-layer contains fine voids and the A-layer contains inorganic particles at a content of 5 to 25 wt %. More preferably, the content of the inorganic particles is in the range of 10 to 20 wt %. It is possible to achieve a high reflectance due to fine voids as well as to design a surface having desirable glossinesses by the lamination structure. Moreover, since the characteristic of the surface of the film can be maintained to be a characteristic of polyester itself, a good adhesive property of the surface (for example, ink adhesive property or lamination property) can be ensured. Furthermore, since a diffusion of light occurs at a boundary between the layers, a higher reflectance can be obtained. With respect to the content of inorganic particles, if the content is less than 5 wt %, a characteristic of the surface to be aimed cannot be easily obtained. If the content is greater than 25 wt %, the stretching ability of the film deteriorates.

As the material of the inorganic particles, silica and calcium carbonate are preferable. Particularly, calcium carbonate is preferable. The light absorbed by calcium carbonate particles is very little, and thereby a film substrate having a high reflectance can be provided. Further, since calcium carbonate itself has a function which forms voids, the reflectance can be further increased.

When inorganic particles are used, a mixture of particles having a mean particle diameter of 0.5 to 2 µm and particles having a mean particle diameter of 2 to 10 µm is preferable. An appropriate surface roughness and an appropriate diffusion of light can be obtained by particles having a mean particle diameter of 0.5 to 2 μm, and at the same time, a sufficient diffusion of light can be achieved by particles having a mean particle diameter of 2 to 10 μm, thereby obtaining a desirable surface.

The process for adding the particles is not particularly restricted. The particles can be added in an extrusion process.

Alternatively, the particles may be added by coating. Even if the addition of the particles is carried out by coating, a bright scope can be obtained similarly to that obtained by the addition in an extrusion process.

In the white polyester film according to the present invention, a fluorescent whitening agent may be added. When the film has a lamination structure, a fluorescent whitening agent is preferably added to an outermost layer. By addition of the fluorescent whitening agent, a white polyester film having a mean reflectance of the surface in the range of wave length of a light of 330 to 380 nm of not less than 90% can be obtained. As a result, a brighter scope can be obtained. The process for adding the fluorescent whitening agent is not particularly restricted. The fluorescent whitening agent can be added in an extrusion process. Alternatively, the fluorescent whitening agent may be added by coating. Even if the fluorescent whitening agent is added by coating, a bright scope can be obtained similarly to that obtained by the addition in an extrusion process. As the fluorescent whitening agent, "OB-1" produced by Eastman Corporation, "Uvitex-OB" produced by Ciba-Geigy Corporation, "Uvitex-MD" produced by Ciba-Geigy Corporation or "JP-Conc" produced by Nihon Kagaku Kogyosho Corporation can be used.

Next, a process for producing the film according to the present invention will be explained. However, the process is not particularly restricted to the following one.

Polymethylpentene is blended as a incompatible polymer and polyethylene glycol is blended as a density lowering agent, respectively, with polyethylene terephthalate. After sufficient blending and drying, the mixture is supplied to an extruder heated at a temperature of 270°–300° C. In a case where a single layer film is made by the polymer, two kinds of the inorganic particles having different mean particle diameters are added as aforementioned. In a case where a film having a lamination structure is made by the polymer, polyethylene terephthalate containing aforementioned two kinds of the inorganic particles having different mean particle diameters is supplied to an extruder "A", the above mixture is supplied to an extruder "B", and the two kinds of polymers are laminated in a lamination structure of A/B or A/B/A before entering into a T-type die or in a T-type laminating die.

The molten sheet delivered from the die is cooled and solidified on a drum having a temperature of 10°–60° C. while applying an electrostatic charge. The sheet is introduced into a group of rollers heated at a temperature of 80°–120° C., the sheet is stretched in the longitudinal direction at a draw ratio of 2–5 times during passage through the rollers, and thereafter, the uniaxially stretched film obtained is cooled by a group of rollers having a temperature of 20°–50° C. The film is introduced into a tenter while the edges of the film are clamped by clips. In the tenter, the film is stretched in the transverse direction in a heated atmosphere having a temperature of 90°–140° C. Although both the draw ratios in the longitudinal and transverse directions are in the range of 2 to 5 times, the area ratio between the non-stretched sheet and the biaxially stretched film is preferably in the range of 6 to 20 times. If the area ratio is less than 6 times, whitening of the film is insufficient. If the area ratio is greater than 20 times, a breakage of the film is liable to occur. After stretching, a thermosetting is conducted in the tenter at a temperature of 150°–240° C. in order to give a flatness and a dimensional stability to the biaxially stretched film. Thereafter, the film is uniformly and gradually cooled to a room temperature, and wound.

The white polyester film thus obtained has a high reflectance of not less than 90% in the range of wave length of a light of 400 to 700 nm, and the dispersion of the reflectance in the range is very small. When the white polyester film is used as a substrate for a reflector of a surface light source having a side light system, a bright scope that is easy to see can be obtained. Further, since the white polyester film according to the present invention has an excellent mean reflectance in the specified range of wave length, the film can be utilized for various uses other than a reflector of a surface light source. For example, when the film is used as a receptor of a bar code printer, the contrast between the bar code portions and the film becomes clear, and accordingly the accuracy for reading can be increased. Further, in a usual printing, the film indicates a very clear and bright whiteness, and a clean and excellent finish can be obtained.

Next, methods for determining and estimating the characteristics in the present invention will be explained.

(1) Glossiness:

The glossiness is determined using a glossiness meter of type VG-107 produced by Nippon Densyoku Kogyo Corporation, under a condition of an angle of incidence and an angle of reflection.

An angle of incidence is defined as the angle of the line connecting the center of aperture for incidence with the center of lens for incidence of the glossiness meter to the normal of sample, in other words, the angle of the direction of incidence to the normal of sample. An angle of reflection is defined as the angle of the line connecting the center of aperture for receiving light with the center of lens for receiving light to the normal of sample, in other words, the angle of the receiving direction. The glossiness shall be calculated from the formula undermentioned by measuring the specular reflection luminous flux $\psi$ s from sample surface and the reflection luminous flux $\psi$ o from standard.

Glossiness (%)=$\psi$ s/$\psi$ o×100

For the standard, on the glass surface, of which refractive index is a constant value of 1.567 over whole range of visible wavelength, the glossiness shall be made the standard and the value shall be expressed as 100%.

(2) Mean reflectance:

An integrating sphere is attached to a spectrophotometer (UV-260: produced by Shimazu Seisakusyo Corporation), a reflectance is determined in the ranges of wave length of 400 to 700 nm and 330 to 380 nm when the reflectance of a MgO plate is defined as 100%. The reflectances are read from the chart obtained at an interval of 5 nm, and the average value is defined as the mean reflectance.

(3) Difference between the maximum and the minimum of the reflectance in the range of wave length of 400 to 700 nm:

The reflectance is determined in the range of wave length of 400 to 700 nm in the manner defined in the above item (2). The maximum value and the minimum value of the reflectance are read from the chart obtained, and the difference between the maximum and the minimum is calculated.

(4) Apparent specific gravity:

The film is cut at 100 mm×100 mm. The thickness of the film sample is determined at points of not less than 10 points, using a dial gauge (No. 2109-10: produced by Mitsutoyo Seisakusyo Corporation) attached with a probe (No. 7002) having a diameter of 10 mm, and the average value "d" μm of the thicknesses determined is calculated.

The weight of the film sample is determined by a direct reading balance and the weight "w"g is read by a unit of $10^{-4}$ g.

The apparent specific gravity is defined by the following equation:

apparent specific gravity=w/d×100

Figure 3:
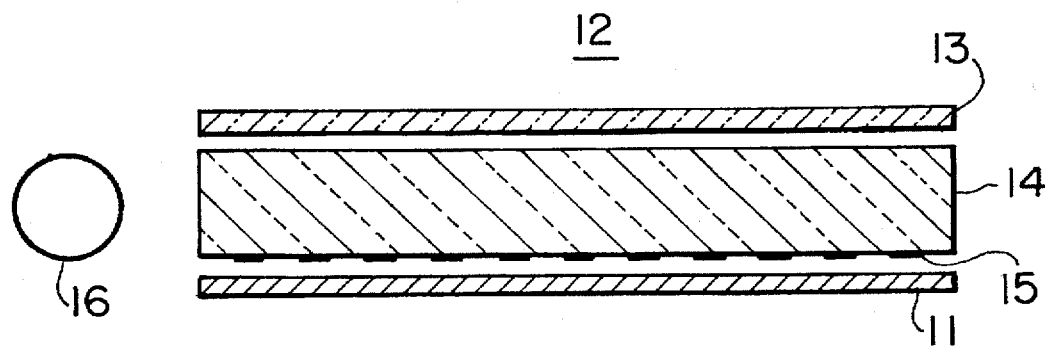
FIG. 3 is a schematic sectional view of a surface light source having a side light system.

(5) Brightness of scope:

In the device shown in FIG. 3, a halftone dot printing is performed on an acrylic plate having a thickness of 3 mm, a film is set as reflector 11, and a light is applied from an edge by a fluorescent tube of 6 watts. The brightness of scope 12 is determined at 15 points by a brightness meter (LS-110: produced by Minolta Corporation), and the average value is defined as the brightness of the scope.

(6) Color tone of scope:

The color tone of a scope is determined by observation. A scope which indicates white is defined as "white", a scope which tends to be yellow is defined as "yellow", and a scope which tends to be blue is defined as "blue".

(7) Surface roughness Ra, Rt:

The surface roughness is determined by a stylus type surface roughness tester (ET-10: produced by Kosaka Kenkyusyo Corporation). Center line average height Ra is defined as a value, when the roughness curve has been expressed by y=f(x), being expressed in micrometer, that is obtained from the following formula, extracting a part of measuring length Z in the direction of its center-line of from the roughness curve, and taking the center-line of this extracted part as X-axis and the direction of vertical magnification as Y-axis.

$Ra=(1/Z)\int_0^Z |f(x)|dx$

Maximum height Rt is defined as a value, when the roughness curve has been interposed between the two parallel straight lines with a mean line of which length corresponds to measuring length Z, expressed in micrometer, measuring the spacing of these two straight lines in the direction of vertical magnification of the roughness curve.

Measuring length Z, mentioned above, 2.5 mm.

(8) Mean particle diameter of inorganic particles:

The inorganic particles are dispersed in ethanol, the particle size distribution is determined by a decanter type particle size distribution measuring apparatus (CAPA500: produced by Horiba Seisakusyo Corporation), and the mean particle diameter is calculated from the determined particle size distribution.

EXAMPLES

Preferred examples will be hereinafter explained together with some comparative examples. The resulted data of determination and estimation are shown in Tables 1 and 2 and FIG. 2.

Example 1

Pellets of polyethylene terephthalate, and master pellets prepared by adding polyethylene glycol having a mean molecular weight of 4000 to polyethylene terephthalate when the polyethylene terephthalate was polymerized, were vacuum dried at a temperature of 180° C. for three hours, and thereafter, the respective pellets were blended so that the content of polyethylene terephthalate was 89 wt %, the content of polyethylene glycol was 1 wt % and the content of polymethylpentene was 10 wt %. The mixture was supplied to an extruder heated at a temperature of 270° to 300° C., the mixture was melt-extruded, and the molten polymer was delivered out from a T-type die in a form of a sheet. The sheet was cooled and solidified by a cooling drum whose surface temperature was controlled at 25° C. The sheet was introduced into a group of rollers heated at a temperature of 85° to 98° C., the sheet was stretched in the longitudinal direction at a draw ratio of 3.4 times and thereafter the uniaxially stretched film was cooled by a group of rollers controlled at 25° C. The film was introduced into a tenter while the edges of the film were cramped by running clips, and the film was stretched in the transverse direction at a draw ratio of 3.6 times in the atmosphere having a temperature of 130° C. in the center. After that, the film was thermoset in the tenter at a temperature of 230° C., the film was uniformly and gradually cooled to a room temperature, and thereafter, the film was wound. The thickness of the film obtained was 188 μm. The characteristics of the film obtained are shown in Tables 1 and 2 and FIG. 2. As shown in Tables 1 and 2, the white polyester film obtained has a high brightness of scope when it is used as a substrate for a reflector of a surface light source.

Example 2

In Example 1, master pellets of a fluorescent whitening agent (OB-1: produced by Eastman Corporation) were added such that the content of the fluorescent whitening agent was 0.03 wt %. A film having a thickness of 188 μm was made in a manner similar to that in Example 1. The characteristics of the film obtained are shown in Tables 1 and 2 and FIG. 2. A scope brighter than that in Example 1 was achieved.

Example 3

Pellets of polyethylene terephthalate, and master pellets prepared by adding polyethylene glycol having a mean molecular weight of 4000 to polyethylene terephthalate when the polyethylene terephthalate was polymerized, were vacuum dried at a temperature of 180° C. for three hours, and thereafter, the respective pellets were blended so that the content of polyethylene terephthalate was 89 wt %, the content of polyethylene glycol was 1 wt % and the content of polymethylpentene was 10 wt %. The mixture was supplied to an extruder "B" heated at a temperature of 270° to 300° C. Pellets of polyethylene terephthalate containing calcium carbonate particles having a mean particle diameter of 1.1 μm at a content of 14 wt % were supplied to an extruder "A" after the pellets were dried in the same manner. The polymers extruded by the extruders "A" and "B" were laminated to form a three-layer lamination structure of A/B/A, and the laminated polymers were delivered out from a T-type die in a form of a sheet. The sheet was stretched in the same manner as that in Example 1 and a biaxially stretched film having a thickness of 188 μm was obtained. The thickness ratio of three layers of the film obtained was 12/164/12 μm. The characteristics of the film obtained are shown in Tables 1 and 2 and FIG. 2. A scope having a high brightness could be achieved.

Example 4

In Example 3, master pellets of a fluorescent whitening agent (OB-1: produced by Eastman Corporation) were added to the raw material to be supplied to the extruder "A" such that the content of the fluorescent whitening agent was 0.03 wt %. A film having a thickness of 188 μm was made in a manner similar to that in Example 3. The characteristics of the film obtained are shown in Tables 1 and 2 and FIG. 2. The reflectance of the film was increased by addition of the fluorescent whitening agent, and a scope brighter than that in Example 3 was obtained.

Example 5

A film was made in the same manner as that in Example 3, and a corona treatment was applied to the film. A coating solution of a mixture of acrylic resin (Coatax: produced by Toray Industries, Inc.)/silica particles (diameter: 1 82 m) isocyanate/fluorescent whitening agent (OB-1: produced by Eastman Corporation) in a ratio of 100/5/20/1 was prepared by diluting the mixture with toluene/methylethylketone (=1/1) so that the content of the mixture was 20 wt %. The solution thus prepared was coated onto the film by a gravure coater to form a coating layer having a thickness of 3 µm.

Figure 2:
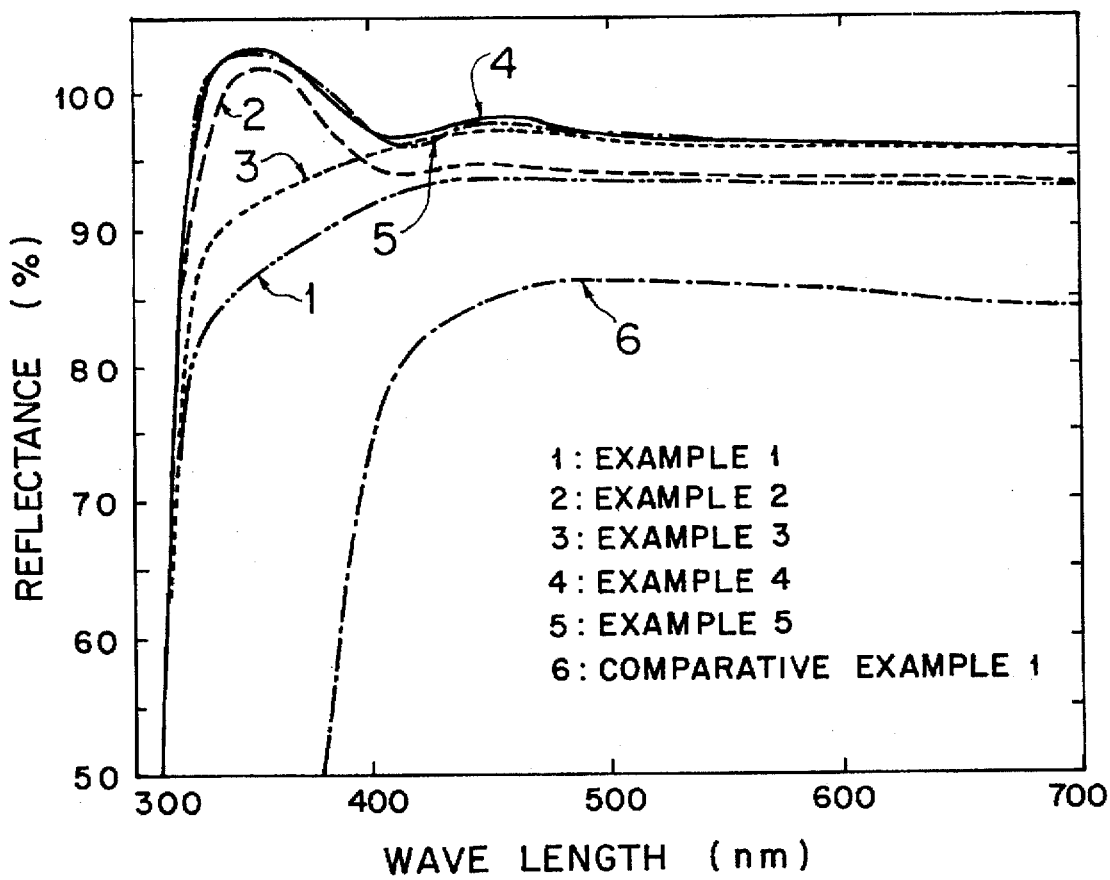
FIG. 2 is a graph showing the relationships between the wave lengths and the reflectances of polyester films in examples and comparative examples.

The characteristics of the film obtained are shown in Tables 1 and 2 and FIG. 2. A scope having a high brightness could be achieved even by coating the fluorescent whitening agent, similarly to in Example 4.

Comparative Example 1

Pellets of polyethylene terephthalate, and master pellets prepared by compounding titanium dioxide particles with polyethylene terephthalate, were vacuum dried at a temperature of 180° C. for three hours, and thereafter, the respective pellets were blended so that the content of titanium dioxide particles was 14 wt %. The mixture was supplied to an extruder and extruded molten polymer was delivered out from a T-type die in a form of a sheet. Thereafter, a film having a thickness of 188 µm was made in a manner similar to that in Example 1. The characteristics of the film obtained are shown in Tables 1 and 2 and FIG. 2. The brightness of scope was decreased because of the absorption of light due to titanium dioxide particles.

Comparative Example 2

A white synthetic paper having a thickness of 200 µm ("YUPO"FPG200: produced by Ouji Yuka Synthetic Paper Corporation) was used as a reflector. The characteristics of the paper are shown in Tables 1 and 2. A high brightness of scope could not be obtained by the synthetic paper.

Example 6

In Example 3, pellets of polyethylene terephthalate containing calcium carbonate particles having a mean particle diameter of 1.1 µm at a content of 14 wt % and silica particles having a mean particle diameter of 4 µm at a content of 3 wt% were supplied to an extruder "A". A film having a thickness of 188 µm was made in a manner similar to that in Example 3. The characteristics of the film obtained are shown in Tables 1 and 2. A scope brighter than that in Example 3 was obtained by toughening the surface of the film more than in Example 3, decreasing the glossiness and increasing the diffusing reflection.

Example 7

A film was made in the same manner as that in Example 3, and a corona treatment was applied to the film. A coating solution of a mixture of acrylic resin (Coatax: produced by Toray Industries, Inc.)/silica particles (diameter: 1 µm) silica particles (diameter: 4 µm)/isocyanate/fluorescent whitening agent (OB-1: produced by Eastman Corporation) whose ratio was 100/5/3/20/1 was prepared by diluting the mixture with toluene/methylethylketone (=1/1) so that the content of the mixture was 20 wt %. The solution thus prepared was coated onto the film by a gravure coater to form a coating layer having a thickness of 3 µm.

The characteristics of the film obtained are shown in Tables 1 and 2. A scope having a high brightness similar to that in Example 6 could be obtained by coating the two kinds of inorganic particles having different diameters.

Example 8

In Example 3, dried pellets of polyethylene terephthalate was supplied to an extruder "A" and a film having a thickness of 188 µm was made in a manner similar to that in Example 3. The characteristics of the film obtained are shown in Tables 1 and 2. Although a certain high brightness of scope could be obtained, a higher brightness of scope such as one in Example 3 could not be obtained because the glossiness was high and the diffusing reflection was poor.

Example 9

A film having a thickness of 188 µm was made in the same manner as that in Example 8, and a corona treatment was applied to the film. Next, the coating was performed in the same manner as that in Example 7, and a coating layer having a thickness of 3 µm was formed. The characteristics of the film obtained are shown in Tables 1 and 2. Although a high brightness of scope such as one in Example 8 could not be obtained by the film itself, a sufficiently high brightness of scope could be obtained by such a coating and increasing the diffusing reflection.

Example 10

In Example 1, master pellets prepared by copolymerizing polytetramethylene glycol with polyethylene terephthalate instead of polyethylene glycol was used, and a film having a thickness of 188 µm was made in a manner similar to that in Example 1. The characteristics of the film obtained are shown in Tables 1 and 2. The reflectance was increased as compared with that of Example 1, and a brighter scope could be obtained.

TABLE 1

| | Apparent specific gravity | Glossiness | | | | | Mean reflectance 400–700 nm (%) | Difference between maximum and minimum of reflectance (%) |
| | | G1 (%) | G2 (%) | G3 (%) | G2/G1 | G3/G1 | | |
| --- | --- | --- | --- | --- | --- | --- | --- | --- |
| Example 1 | 0.80 | 41 | 5 | 5 | 0.12 | 0.12 | 93 | 5 |
| Example 2 | 0.80 | 41 | 5 | 5 | 0.12 | 0.12 | 94 | 5 |
| Example 3 | 0.80 | 28 | 6 | 5 | 0.21 | 0.18 | 96 | 4 |
| Example 4 | 0.80 | 28 | 6 | 5 | 0.21 | 0.18 | 97 | 4 |
| Example 5 | 0.80 | 32 | 6 | 5 | 0.19 | 0.16 | 97 | 4 |

TABLE 1-continued

|  | Apparent specific gravity | Glossiness | | | | | Mean reflectance 400–700 nm (%) | Difference between maximum and minimum of reflectance (%) |
|  |  | G1 (%) | G2 (%) | G3 (%) | G2/G1 | G3/G1 |  |  |
| --- | --- | --- | --- | --- | --- | --- | --- | --- |
| Comparative Example 1 | 1.50 | 58 | 4 | 4 | 0.07 | 0.07 | 85 | 12 |
| Comparative Example 2 | 0.79 | 15 | 8 | 7 | 0.53 | 0.47 | 90 | 10 |
| Example 6 | 0.80 | 16 | 8 | 6 | 0.49 | 0.38 | 96 | 4 |
| Example 7 | 0.80 | 20 | 8 | 5 | 0.40 | 0.25 | 96 | 4 |
| Example 8 | 0.83 | 110 | 4 | 3 | 0.04 | 0.03 | 94 | 6 |
| Example 9 | 0.83 | 23 | 8 | 5 | 0.35 | 0.22 | 95 | 5 |
| Example 10 | 0.80 | 40 | 5 | 5 | 0.13 | 0.13 | 95 | 4 |

TABLE 2

|  | Mean reflectance 330–380 nm (%) | Surface roughness | | | Brightness of scope (nit) | Color tone of scope |
|  |  | Ra (μm) | Rt (μm) | Rt/Ra (μm) |  |  |
| --- | --- | --- | --- | --- | --- | --- |
| Example 1 | 88 | 0.11 | 1.0 | 9 | 198 | white |
| Example 2 | 100 | 0.11 | 1.0 | 9 | 203 | white |
| Example 3 | 92 | 0.17 | 1.9 | 11 | 201 | white |
| Example 4 | 102 | 0.18 | 1.8 | 10 | 205 | white |
| Example 5 | 102 | 0.15 | 1.7 | 11 | 204 | white |
| Comparative Example 1 | 25 | 0.10 | 0.7 | 7 | 180 | yellow |
| Comparative Example 2 | 57 | 0.55 | 6.1 | 11 | 182 | yellow |
| Example 6 | 94 | 0.40 | 4.3 | 11 | 205 | white |
| Example 7 | 100 | 0.33 | 4.0 | 12 | 206 | white |
| Example 8 | 88 | 0.03 | 0.3 | 10 | 194 | yellow |
| Example 9 | 99 | 0.33 | 3.4 | 10 | 202 | white |
| Example 10 | 90 | 0.12 | 1.1 | 9 | 202 | white |

Although several preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A reflector for use in a surface light source comprising a biaxially stretched white polyester laminated film comprising one or more layers of (A), a white polyester film having 5 to 25 weight percent inorganic particles, and (B), a white polyester film having fine voids and 2 to 25 weight % polyolefin; and at least an outermost layer of A contains a fluorescent whitening agent;

wherein said biaxially stretched polyester laminated film has an apparent specific gravity of from 0.5 to 1.2 and a lamination structure of A/B or A/B/A; and the mean reflectance measured from the A surface of the biaxially stretched white polyester laminated film, in the range of wavelength of a light of 300 to 380 nm, is not less than 90%.

2. A reflector for use in a surface light source comprising a biaxially stretched white polyester laminated film comprising one or more layers of (A), a white polyester film having 5 to 25 weight percent inorganic particles, and (B), a white polyester film having fine voids and 2 to 25 weight % polyolefin; said biaxially stretched white polyester laminated film having provided thereon a coating layer containing a fluorescent whitening agent;

wherein said biaxially stretched white polyester laminated film has an apparent specific gravity of from 0.5 to 1.2 and a lamination structure of A/B or A/B/A; and the mean reflectance measured from the A surface of the biaxially stretched white polyester laminated film, in the range of wavelength of a light of 300 to 380 nm, is not less than 90%.

* * * * *